April 17, 1951 J. G. BAKER 2,549,561
MOTION CONVERTING MECHANISM
Filed Feb. 26, 1948 3 Sheets-Sheet 1

WITNESS
H. C. Strueber

John G. Baker INVENTOR.

April 17, 1951 J. G. BAKER 2,549,561
MOTION CONVERTING MECHANISM
Filed Feb. 26, 1948 3 Sheets-Sheet 3 witness
H C Stueber

John G. Baker INVENTOR.

Patented Apr. 17, 1951

2,549,561

UNITED STATES PATENT OFFICE 2,549,561

MOTION CONVERTING MECHANISM

John G. Baker, Evansville, Wis., assignor to Baker Manufacturing Company, Evansville, Wis., a corporation of Wisconsin Application February 26, 1948, Serial No. 11,050

3 Claims. (Cl. 74—42)

This invention relates to motion converting mechanism of the type in which a rotary drive wheel or gear is connected by a pitman to an oscillatory arm, and has more particular reference to such a mechanism in which a single pitman is employed.

The general object is to provide a mechanism of the above character which permits the use of plain pitman bearings while maintaining uniform loading of the bearing surfaces throughout their lengths.

A more detailed object is to correlate the construction of the oscillatory arm with the deflection characteristics of the pitman in a novel manner such that the line of action of the resultant bearing load extends substantially through the longitudinal center of the bearing.

Other objects and advantages of the invention will become apparent from the following detailed description taken in connection with the accompanying drawings.

Referring to the drawings.

Figure 1:
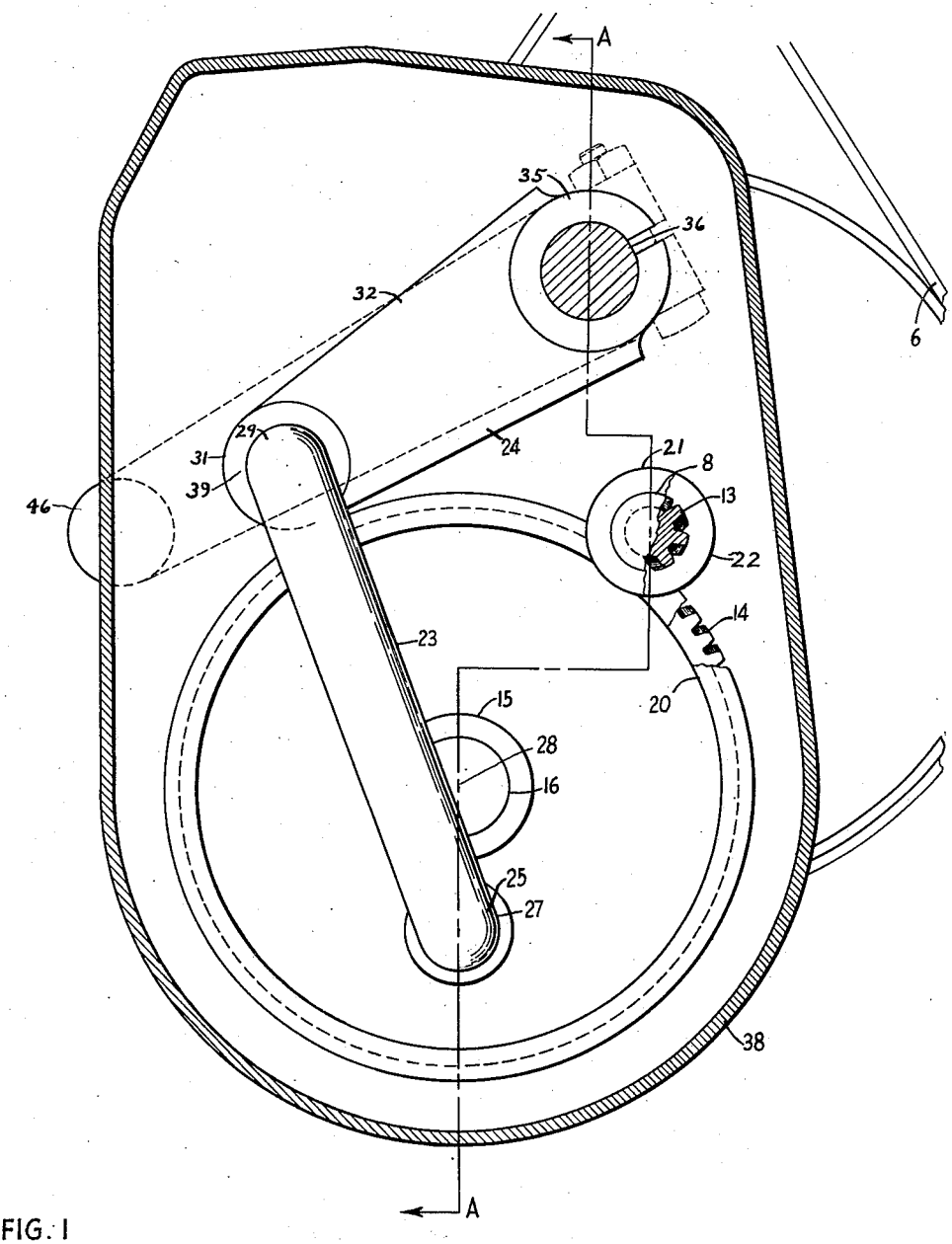
Figure 1 is a vertical sectional view through a motion converting mechanism involving the novel features of the present invention, the section being taken along line C—C of Figure 2.

While the invention is susceptible of various modification and alternative constructions, I have shown in the drawings and will describe in detail the preferred embodiment. It is understood however, I do not intend to limit the invention by such disclosure, but aim to cover all modifications and alternative constructions falling within the spirit and scope of the invention as expressed in the appended claims.

Figure 2:
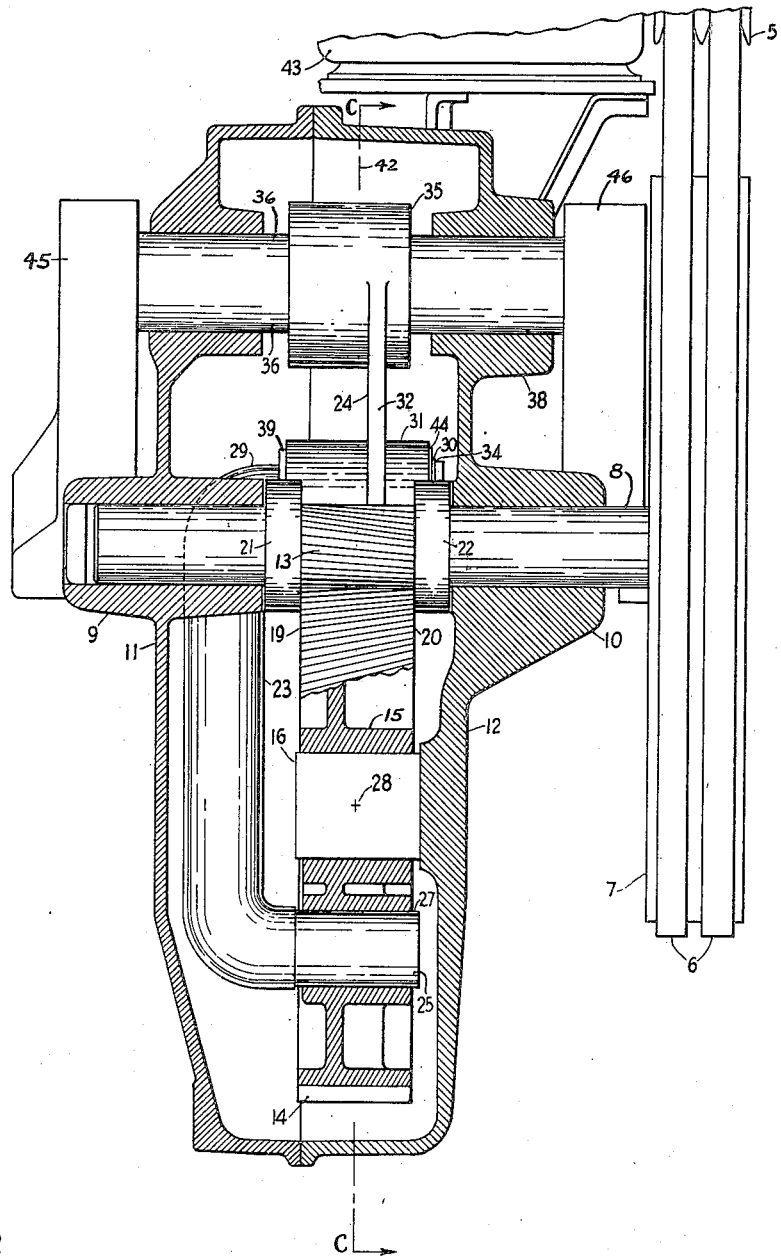
Figure 2 is a section taken along line A—A of Figure 1.

Referring to Figures 1 and 2, the invention is shown for the purpose of converting rotary power derived from an electric motor or other actuating source into oscillatory motion capable of being applied to a driven member, for example a pump.

The operating apparatus is shown enclosed and supported in a hollow casing 38, the driven and driving power being transmitted through the walls of said casing. The motor 43 is supported on a bracket 37 and a driver pulley 5 carries belts 6 driving a pulley 7 on the outer end of a shaft 8. The latter projects into the casing 38 and is journaled in radial bearings 9 and 10 carried by opposite sidewalls 11 and 12 of said casing. A simple gear reduction serves to reduce speed and a crank mechanism is provided for converting the rotary motion into reciprocating motion. To this end, a pinion 13 integral with said shaft disposed within the casing 38 drives a larger helical gear 14.

The gear hub 15 is journaled on a stud 16 projecting from the casing wall 12 and cast integral therewith. The gear hub 15 is unrestrained axially as there is no resultant axial force acting on said gear and because it is located in an axial direction by the neutralizing collars 21 and 22. As an alternative construction, gear 14 could be provided with axial restraint at the gear hub 15 which would eliminate the necessity of axial restraint of the pinion 13.

Two neutralizing collars 21 and 22 are press fitted or otherwise secured to the shaft 8 laterally disposed along said shaft each to be adjacent to a rim 19 or 20 of said gear and extending radially substantially the depth of said gear rim. The pressure between the rims 19 or 20 of said gear and the shoulder of the collars 21 or 22 respectively, sustains the end thrust of the helical gears in the locality of the thrust, the direction of gear cut and power torque determining the direction of thrust and consequently which collar will sustain the thrust.

Figures 3, 4:
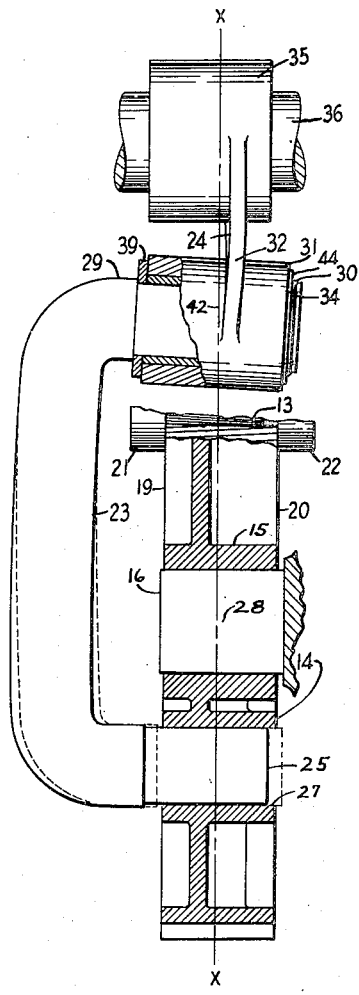
Figure 3 is a fragmentary section from Figure 2 showing the deflection of the parts as power is applied.
Figure 4 is a diagrammatic sketch to explain a more elementary form of elastic matching.

In Figures 1, 2, and 3, a pitman 23 connects the gear 14 to the oscillatory member 24. The pitman 23 is of a general U shape with the closed end of the U toward the casing wall 12. The lower end of the pitman 25 is provided with a bearing surface and eccentrically journaled in a hole 27 in the gear, being unrestrained in the direction of its bearing axis allowing movement of pitman journal. This axial movement is illustrated in Figure 3, the dotted lines indicating the position of the pitman without load and the solid lines showing deflection with load. The bearing hole 27 is spaced a distance from the gear axis 28 to give the proper crank throw. The upper end of the pitman 29 is similarly provided with a bearing surface journaled in a sleeve 31. Axial movement of the upper pitman journal 29 is prevented by a collar 44 held in position by a snap ring 30 in a recess 34 on said journal and by a shoulder 39 on the pitman side of the journal.

The oscillatory member 24 comprises a relatively flat web 32 opposite ends of which abut against and are welded or otherwise secured rigidly to the sides of sleeves 31 and 35 forming bearing hubs which, in the form shown in Fig. 3, project from opposite sides of the web. The sleeve 35 at the pivotal end of the web is keyed or otherwise secured to an oscillating shaft 36, the ends of said shaft extending through the casing walls and externally fitted with arms 45 and 46 to be connected to a member to be actuated. In accordance with the present invention, the pitman 23 and the oscillatory arm 24 are matched elastically so that the resultant line of action of the load on the active surface of the bearing 31 will at all times extend substantially through the longitudinal center of this surface. To this end, the stiffness or resistance to lateral bending of the pitman 23 and the arm 24 are correlated with each other and with the location of the arm along the bearing 31. Such correlation is achieved by making the web 24 relatively wide and flat and somewhat more flexible than the pitman 23 and by locating this web on the opposite side of the bearing center from the pitman 23. The spacing of the web from this center is determined by the relative stiffness of the parts.

The required construction and location of the parts to achieve the foregoing ends may be determined mathematically. Referring to the elemental illustrations in Fig. 4, imagine the material of the bearing temporarily removed except for a small contact zone in the middle of the bearing. Assume elastic behavior and let:

$C_1$ = load angular stiffness of the given member 40 referred to the center of the bearing (in pounds per radian).

$d$ = distance between the center of the bearing and the center of bending of bearing of the adjacent member 41 (in inches).

$K_2$ = the moment angular stiffness of the adjacent member 41 (inch pounds per radian).

$L$ = bearing load (in pounds).

$\theta_1$ = angular deflection of the given member 40.

$\theta_2$ = angular deflection of the adjacent member 41.

From the definition of $K_2$ and $C_1$ $$Ld = K_2\theta_2 \quad (1)$$
$$L = C_1\theta_1 \quad (2)$$

Elastic matching is when $\theta_1 = \theta_2$ under which condition the material of the bearing heretofore imagined removed can be considered replaced, and the load L distributed uniformly along the length of the bearing.

From (1) and (2) with $\theta_1 = \theta_2$ $$d = \frac{K_2}{C_1} \quad (3)$$

(3) represents the condition for elastic matching.

The given member 40 in Figure 4 corresponds to the pitman 23 in Figure 3, and the adjacent member 41 in Figure 4 to the oscillatory member 24 in Figure 3. The bending of the arm 41 corresponds to the bending of the web 32. The distance $d$ in Figure 4 corresponds to the axial distance between web 32 and the center of the oscillatory member bearing 31 which center lies in the force plane X—X as shown in Figure 3. Thus the pitman 23 and the member 24 are elastically matched by the choice of the stiffness of the web 32 in combination with the axial location of the web 32 relative to the stiffness of the pitman 23. With elastic matching, the resultant force on the upper end of the pitman is at the center 42 of the bearing 31. In other words, the moment on the upper end of the pitman about 42 is zero and the effective force is in the force plane.

If the axial force on the lower pitman bearing is zero, which is to be expected because of copious lubrication and rotation of the journal relative to the bearing, then equilibrium demands that the normal force on the lower pitman bearing also be in the force plane. In short, proper matching of the member 24 to the pitman 23 not only aligns the upper bearing, but also aligns the lower bearing if the lower pitman journal is free to deflect axially with respect to the gear.

In Fig. 3, the assembly of the gear 14, pitman 23, and member 24 are shown to indicate the relative positions due to bending stresses as power is applied at the beginning of the up stroke of the pitman. As the pitman bends with load, the web 32 of the member 24 bends with sufficient resistance to maintain the effective force in the center of the rocker arm journal 31, that is, in the force plane, to maintain uniform bearing pressure. The lower end of the pitman 25 is unrestrained axially maintaining the effective force at the lower pitman bearing 25 in the force plane as noted above. This axial freedom also eliminates the deflection of the gear 14 which would otherwise result from transverse forces at the lower pitman journal 25.

I claim as my invention:

1. In a motion converting mechanism, the combination of, a rotary drive wheel, a single C-shaped pitman having an intermediate portion disposed alongside said wheel and having parallel end portions one projecting through and journaled in the wheel eccentrically of the wheel axis, the other end portion paralleling said axis and projecting across the periphery of said wheel, a sleeve journaled on said second end portion and providing a cylindrical bearing surface thereof, and an arm more flexible than said pitman mounted to swing about an axis paralleling the axis of said wheel and rigidly connected to said sleeve, said arm being axially offset from the longitudinal center of said bearing surface on the side of the center opposite said pitman a distance correlated with the stiffness of said pitman and said arm.

2. A motion converting mechanism as defined in claim 1 in which said distance between said arm and said bearing surface center is substantially less than the distance between said center and said intermediate portion of said pitman.

3. A motion converting mechanism as defined in claim 2 in which the lateral flexibility of said arm is greater than that of said pitman by an amount sufficient to locate on said bearing surface center the line of action of the resultant actuating force transmitted from said pitman to said sleeve.

JOHN G. BAKER.

REFERENCES CITED

The following references are of record in the file of this patent:

UNITED STATES PATENTS

| Number | Name | Date |
|---|---|---|
| 1,470,634 | Myers | Oct. 16, 1923 |
| 1,548,545 | Niederhauser | Aug. 4, 1925 |
| 2,343,211 | Warneke et al. | Feb. 29, 1944 |
| 2,350,334 | Baker | June 6, 1944 |